(12) United States Patent
Tang et al.

(10) Patent No.: US 12,319,980 B2
(45) Date of Patent: Jun. 3, 2025

(54) SYSTEM FOR SMELTING TIN-CONTAINING MATERIALS AND METHOD FOR SMELTING SAME

(71) Applicant: YUNNAN TIN CO. LTD. TIN BRANCH, Honghe (CN)

(72) Inventors: Duzuo Tang, Honghe (CN); Xingcheng Song, Honghe (CN); Haibin Yuan, Honghe (CN); Wanli Xu, Honghe (CN); Chi Zhang, Honghe (CN); Jianwei Wang, Honghe (CN); Yun Chen, Honghe (CN); Qingdong Liu, Honghe (CN); Mingjiang Wang, Honghe (CN); Junjie Li, Honghe (CN); Ge Song, Honghe (CN)

( * ) Notice: Subject to any disclaimer, the term of this patent is extended or adjusted under 35 U.S.C. 154(b) by 521 days.

(21) Appl. No.: 17/692,059

(22) Filed: Mar. 10, 2022

(65) Prior Publication Data
US 2023/0015594 A1 Jan. 19, 2023

Related U.S. Application Data

(63) Continuation of application No. PCT/CN2022/075947, filed on Feb. 11, 2022.

(30) Foreign Application Priority Data

Jul. 16, 2021 (CN) .......................... 2021108065485

(51) Int. Cl.
*C22B 25/02* (2006.01)
*C22B 1/04* (2006.01)
(Continued)

(52) U.S. Cl.
CPC ................ *C22B 25/02* (2013.01); *C22B 1/04* (2013.01); *C22B 5/10* (2013.01); *C22C 30/04* (2013.01)

(58) Field of Classification Search
CPC .. C22B 25/02; C22B 1/04; C22B 5/10; C22B 1/00; C22C 30/04; C22C 13/00; F27B 15/00
(Continued)

(56) References Cited

U.S. PATENT DOCUMENTS 3,938,987 A * 2/1976 Ban .......................... C22B 1/20
75/484
4,758,268 A * 7/1988 Bishop .................... C22B 19/04
75/476
(Continued)

FOREIGN PATENT DOCUMENTS

CN 111321301 * 6/2020 ........... C22B 11/021
GB 2601212 * 5/2022 ........... C22B 11/021

OTHER PUBLICATIONS

CN111321301, Song et al., System and Method for Efficiently Recovering Valuable Metals in Tin Secondary Raw Materials, Jun. 23, 2020 (Year: 2020).*

*Primary Examiner* — Jessee R Roe
*Assistant Examiner* — Michael Aboagye

(57) ABSTRACT

A system for smelting tin-containing materials is disclosed. The system includes a pretreatment mechanism, a screening mechanism, a feeding mechanism, a smelting mechanism, a slag treatment mechanism and a tail gas treatment mechanism. In addition, the disclosure discloses a method by using the above system. In the disclosure, dry tin-containing materials can be sieved, and fine tin-containing materials can be conveyed into top-blown furnace molten pool for smelting through the belt, while the coarse tin-containing materials can be sprayed into the molten pool through the spray gun, which can reduce the splashing or material leakage loss of the tin-containing materials with smaller particle size during the transportation process, and also avoid the mechanical inclusion or flying loss caused by the (Continued)

belt; furthermore, the fine dry materials are prevented from adding water before entering furnace, thereby reducing smelting energy consumption and smelting flue gas quantity, and realizing environment-friendly and energy-saving smelting.

6 Claims, 1 Drawing Sheet

(51) Int. Cl.
    *C22B 5/10*     (2006.01)
    *C22C 30/04*     (2006.01)

(58) Field of Classification Search
    USPC .......................................... 75/381, 690, 432
    See application file for complete search history.

(56) References Cited

U.S. PATENT DOCUMENTS

| | | | |
|---|---|---|---|
| 7,175,690 B2 * | 2/2007 | Potter | C21B 13/02 |
| | | | 75/488 |
| 8,956,564 B2 * | 2/2015 | Kojo | F27D 3/0033 |
| | | | 414/161 |
| 11,993,826 B2 * | 5/2024 | Buffington | C22B 11/04 |

* cited by examiner

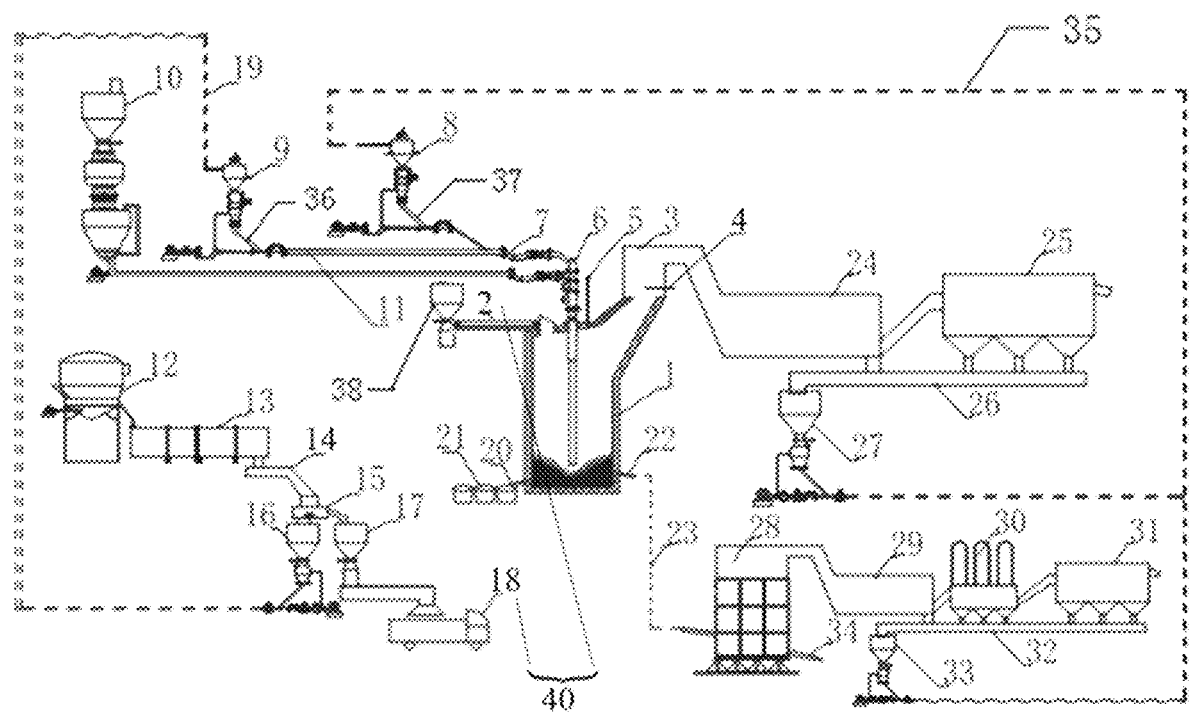

SYSTEM FOR SMELTING TIN-CONTAINING MATERIALS AND METHOD FOR SMELTING SAME

TECHNICAL FIELD

The present disclosure relates to the technical field of pyrometallurgical smelting of crude tin from tin concentrate, in particular to a system and method for smelting tin-containing materials.

BACKGROUND ART

At present, in the production process of smelting crude tin with tin-containing materials, all tin-containing materials are transported to the top of the furnace through a belt, and then put into the smelting furnace for reduction smelting to produce crude tin. In addition, the tin-containing material with low moisture and fine granularity needs to be granulated with water so that the moisture content in the mixture can reach 10%~12%. However, the increase of water content will not only occupy the smelting productivity and increase the smelting energy consumption, but also increase the processing capacity and cost of the flue gas treatment system due to the vaporization of water in the mixture after high temperature, and the generated high-temperature steam enters the flue gas treatment system of the subsequent process in large quantities.

At the same time, due to the complex composition and properties of various tin-containing materials, pretreatment before smelting, such as desulfurization and dearsenization, is usually needed to produce various tin-containing fine dry materials, such as tin-containing fine dry materials from fluosolid furnace roasting, high tin-containing soot from fuming furnace and high tin-containing soot from other smelting furnaces. All kinds of tin-containing fine dry materials need to be transported to the batching silo by pneumatic pipeline or special vehicle for batching in front of the furnace, and then transported to the smelting furnace by belt for smelting. Wherein, all kinds of tin-containing fine dry materials are prone to spill, material leakage and other losses during the transportation process. In addition, the fine tin-containing dry material with fine grain size is transported into the smelting furnace by belt, and the falling distance in the smelting furnace is more than 10 m, so it is easy to be drawn into the tail gas dust collector along with the furnace flue gas, the dust collector then returns to the burden ore bin to enter the next process of burden charging into the furnace, and the repeated reverse transport in the process will further accelerate the loss of materials, resulting in a low comprehensive recovery rate of tin smelting, at the same time, it also causes the poor environmental sanitation on the site and damages the physical health of the operators.

Therefore, it is an urgent problem for technicians in this field to provide a new system and method for smelting tin-containing materials, aiming at the phenomena of increasing smelting energy consumption, increasing burden of tail gas treatment system, metal loss caused by repeated transportation, metal loss and poor sanitation environment caused by dust flying, and low comprehensive recovery rate of tin smelting.

SUMMARY

In view of the above, the disclosure provides a system and method for smelting tin-containing materials, which can obviously improve the tin smelting operation environment, improve the recovery rate of tin-containing fine dry materials, and achieve the effect of green energy saving.

In order to achieve the above purpose, the present disclosure adopts the following technical scheme:

The disclosure provides a system for smelting tin-containing materials, including a pretreatment mechanism, a screening mechanism, a feeding mechanism, a smelting mechanism, a slag treatment mechanism and a tail gas treatment mechanism;

the screening mechanism includes a screening machine, a fine material bin and a coarse material bin;

the upstream of the screening machine is connected with the downstream of the pretreatment mechanism, the upper-screen material outlet of the screening machine is connected with the coarse material bin, the under-screen material outlet of the screening machine is connected with the fine material bin, and the coarse material bin and the fine material bin are respectively connected with the smelting mechanism through the feeding mechanism;

the feed mechanism comprises a feeding device, a batching bin, a first front bin, a second front bin, a spray gun and a pulverized coal bin; the coarse material bin is communicated with the batching bin through the feeding device, and the batching bin is communicated with the smelting mechanism through the feeding device; the upstream of the first front bin is communicated with the fine material bin, and the downstream is communicated with the smelting mechanism through the spray gun; the upstream of the second front bin is respectively communicated with the slag treatment mechanism and the tail gas treatment mechanism, and the downstream is communicated with the smelting mechanism through the spray gun; in addition, the pulverized coal bin communicated with the smelting mechanism through the spray gun.

Further preferably, the feeding device includes a special charging truck and a belt.

The preferred technical scheme has the beneficial effects that: the disclosure screens dry tin-containing materials, so that tin-containing materials with larger particle size can be directly conveyed into the melting pool of the top-blown furnace through the belt for smelting, while tin-containing materials with smaller particle size can be sprayed into the melting pool through the top-blown spray gun, which can reduce the splashing or material leakage loss of tin-containing materials with smaller particle size during the transportation process, and also avoid the mechanical inclusion or flying loss caused by the belt top being put into the top-blown furnace. In addition, the fine dry materials are prevented from adding water before entering the furnace, thereby reducing smelting energy consumption and smelting flue gas quantity, and realizing greener, environment-friendly and energy-saving smelting.

Preferably, the pretreatment mechanism includes a fluosolid furnace, a cooler and a fluosolid furnace scraper;

the downstream of the fluosolid furnace is connected with the cooler;

the downstream of the cooler is connected with the fluosolid furnace scraper;

the downstream of the fluosolid furnace scraper is connected with the screening machine.

Wherein, the cooler is used for cool the tin-containing intermediate material roasted by the fluosolid furnace.

The preferable technical scheme has the beneficial effects: The fluosolid furnace with high-sulfur arsenic-containing tin ore can be classified and treated separately by a pretreatment mechanism, and low-sulfur, low-arsenic and tin-containing materials are provided for the top-blown furnace, the material roast by the fluosolid furnace is pneumatically conveyed to the top-blown furnace for smelting, and the materials are hermetically conveyed by pneumatic force, so that the flying or sprinkling loss of the materials in the belt conveying and reversing can be reduced. In addition, the disclosure creates favorable condition for the top-blown furnace to realize powder injection, and is beneficial to increase the smelting recovery rate of tin material.

Preferably, the feeding mechanism further includes a first pneumatic pipeline, a first blanking pipeline, a second pneumatic pipeline, a second blanking pipeline, a mixing pipeline and a metal hose;
  the first pneumatic pipeline is connected with the fine material bin and the first furnace front bin, and the first furnace front bin is connected with the mixing air pipeline through the first blanking pipeline;
  the upstream of the second pneumatic pipeline is connected with the slag treatment mechanism and the tail gas treatment mechanism respectively, and the downstream is connected with the second front bin, the second front bin is connected with the mixing air pipeline through the second blanking pipeline;
  the mixing air pipeline is 70~75 degrees with the first blanking pipeline and the second blanking pipeline respectively, and the mixing air pipeline is connected with the spray gun through the metal hose.

The preferable technical scheme has the beneficial effects: the mixing air pipeline, the first blanking pipeline and the second blanking pipeline are designed according to the best bevel angle, so as to ensure the powder to be fully mixed, and the blanking is smooth and not blocked.

Further preferably, the smelting mechanism includes a top-blown furnace, a furnace top sample rod, a coarse tin mouth, a tin-converting bun and a slag mouth;
  the top of the top-blown furnace is communicated with the feeding device and connected with the tail gas treatment mechanism at the same time; wherein the spray gun penetrates through the top surface of the top-blown furnace and extends into the top-blown furnace, while the furnace top sample rod penetrates through the top surface of the top-blown furnace and extends into the top-blown furnace; and the bottom of the top-blown furnace is connected with the tin-turning steamed stuffed bun through the coarse tin port, and the bottom of the top-blown furnace is connected with the slag treatment mechanism through the slag port.

The preferable technical scheme has the beneficial effects: the top-blown furnace is used to realize the efficient smelting and recovery of crude tin from tin-containing materials, and the produced top-blown furnace slag is sent to the next process for recovery treatment.

Preferably, the slag treatment mechanism includes a slag chute, a fuming furnace, a fuming furnace waste heat boiler, a fuming furnace surface cooler, a fuming furnace bag dust collector, a fuming dust scraper and a fuming dust bin; the fuming furnace is connected with the slag port through the slag chute, the bottom of the fuming furnace is provided with a slag discharge port of fuming furnace, and the top of the fuming furnace is connected with the fuming furnace waste heat boiler; the downstream of the fuming furnace waste heat boiler is connected with the fuming furnace surface cooler; the downstream of the fuming furnace is connected with the fuming furnace bag dust collector; the upstream of the fuming furnace dust scraper is respectively connected with the fuming furnace waste heat boiler and the fuming furnace bag dust collector, and the downstream is connected with the top-blown furnace dust bin; the downstream of the fuming furnace dust bin is connected with the second front bin through the second pneumatic pipeline.

The preferable technical scheme has the beneficial effects: realizing the full fuming recovery of the tin-containing slag of the top-blown furnace and avoid the loss of tin.

Preferably, the tail gas treatment mechanism comprises a flue, a top-blown furnace waste heat boiler, a temperature measuring device, a top-blown furnace electric dust collector, a top-blown furnace dust scraper and a top-blown furnace dust bin; one end of the flue is connected with the top of the top-blown furnace, the other end is connected with the top-blown furnace waste heat boiler, and the temperature measuring device is installed at one end of the flue connected with the top of the top-blown furnace; the downstream of the top-blown furnace waste heat boiler is connected with the top-blown furnace electric dust collector; the upstream of the top-blown furnace dust scraper is respectively connected with the top-blown furnace waste heat boiler and the top-blown furnace electric dust collector, and the downstream is connected with the top-blown furnace dust bin; the downstream of that dust bin of the top-blown furnace is connected with the second front bin through the second pneumatic pipeline.

The preferable technical scheme has the beneficial effects: the tin-containing tail gas in the top-blown furnace flue gas can be efficiently recovered, and the loss caused by the tin-containing tail gas entering the back-end sulphuric acid system can be reduced.

The disclosure also provides a method for smelting tin-containing materials by using the system of claim 6, specifically including:
  (1) classifying all kinds of tin ores, transporting the obtained low-sulfur arsenic-containing tin ore to a batching bin by a special skip truck, conveying the obtained high-sulfur and arsenic-containing tin ore to a fluosolid furnace for pretreatment to obtain dry tin-containing materials; conveying the tin-containing dry material to a screening machine for screening, spraying the obtained tin-containing fine dry material into the top-blown furnace through a spray gun, transporting the obtained tin-containing coarse dry material to a batching bin by a special skip truck;
  (2) in a feeding cycle, feeding the low-sulfur arsenic-containing tin ore and the coarse tin-containing dry material with a flux of quartz sand and limestone into the top of a top-blown furnace through a belt after proportioning in a batching bin, according to the proportion, controlling the amount of the tin-containing fine dry material sprayed into the top-blown furnace by the spray gun and the amount of the recovered tin-containing material, and mixed melt is obtained after smelting in the top-blown furnace; then, stopping feeding and entering a reduction stage to obtain crude tin products and a top-blown furnace slag; according to the flue gas temperature measured by temperature measuring device and the change of CO concentration in tail gas measured by CO tail gas online monitor, adjusting the amount of lump coal fed by belt and pulverized coal fed by spray gun;
  (3) stopping feeding lump coal by belt and pulverized coal by spray gun after reduction, lifting the spray gun above the liquid level of the mixed melt; then opening the coarse tin port to input the coarse tin product into the tin-transfer pad; after reaching the slag discharge, blocking the coarse tin port, and opening the slag port to discharge the slag of the top-blown furnace to a fuming furnace for fuming treatment to obtain fuming dust; treating the tail gas produced by smelting in the top-blown furnace with tail gas to obtain recovered tail gas; conveying the recover tail gas and the fumed dust are respectively to a second front bin through a second pneumatic pipeline to form the recovered tin-containing material;

(4) after the top-blown furnace slag is discharged, steps (2) to (3) can be repeated.

The preferable technical scheme has the beneficial effects: the disclosure discloses a method for smelting tin-containing materials, which classifies and screens dry tin-containing materials, and the obtained low-sulfur arsenic-containing tin ore and coarse-grained dry tin-containing materials can be directly transported to the top-blown furnace for smelting by special material truck and belt. In addition, the fine tin-containing dry materials and recycled tin-containing materials with fine particle size are transported through fully enclosed pneumatic pipeline and sprayed into the molten pool of top-blowing furnace through spray gun, so that the materials with fine particle size are splashed or leaked during the reverse transportation process, and the loss of mechanical inclusion or flying caused by being put into top-blown furnace through belt can also be avoided.

Preferably, in the step (1), in the low-sulfur arsenic-containing tin ore, Sn is more than 30 wt. %, Pb is 0.2~3.0 wt. %, S is less than 1.0 wt. %, As is less than 1.0 wt. %, Fe is 10~30 wt. %, and Bi is 0.1~0.2 wt. %; in the high-sulfur arsenic-containing tin ore, Sn is more than 30 wt. %, Pb is 0.2~3.0 wt. %, S is more than 2.0 wt. %, As is more than 2.0 wt. %, Fe is 10~30 wt. %, and Bi is 0.1~0.5 wt. %;

the pretreatment is roasting at 650 to 720° C. for 2~2.5 h, the moisture content of the dry tin-containing material is less than 1%, Sn is more than 40 wt. %, Pb is 0.5~3.0 wt. %, S is less than 1.0 wt. %, As is less than 1.0 wt. %, Fe is 12~28 wt. %, and Bi is 0.05~0.2 wt. %;

in the screening, a 5-mesh screen is adopted, the granularity of the tin-containing fine dry material is 5~300 mesh, the granularity of the tin-containing coarse dry material is less than 5 mesh, and the bulk density is 2~3 g/cm$^3$.

Preferably, in the step (2), in the recover tin-containing material, Sn is 30~50 wt. %, Pb is 0.2~3.0 wt. %, S is less than 1.0 wt. %, As is less than 2.0 wt. %, Fe is 2~6 wt. %, Bi is 0.1~0.3 wt. %, moisture is less than 5.0%, Particle size is 100~300 mesh, bulk density is 0.5~1.0 g/cm$^3$;

wherein, calculating the low-sulfur arsenic-containing tin ore, the tin-containing fine dry material, the tin-containing coarse dry material and the recovered tin-containing material comprehensively in the proportioning silo according to the proportioning principle, accurately controlling the addition amount of the low-sulfur arsenic-containing tin ore and the tin-containing coarse dry material input through the belt through the DCS feeding system of the batching bin, and simultaneously controlling the addition amount of the tin-containing fine dry material and the recovered tin-containing material input into the top blowing furnace through the spray gun.

the composition principle is: Sn content 38~48 wt. %, Pb content 1.0~5.0 wt. %, S content is more than 1.0 wt. %, Bi content 0.1~0.2 wt. %, As/Fe ratio 0.07~0.12, the silica sand and the limestone flux are added according to the silicic acid K is 1.2 to 1.4 and the melting point is 1150~1320° C.;

the low-sulfur arsenic-containing tin ore, the tin-containing fine dry material, the tin-containing coarse dry material and the recovered tin-containing material are calculated in 100 wt. %, 30~40 wt. %, 0~45 wt. %, 5~10 wt. %, 0~20 wt. %;

in the smelting process: the back pressure of the spray gun is 20~30 kPa, the flue gas temperature is 400~500° C., the negative pressure of the hearth of the top-blown furnace is −10~0 Pa, the oxygen-enriched concentration of the spray gun air is 37~39 wt. %, the tail gas CO concentration is 0~500 ppm, the pulverized coal feed rate of the spray gun is 5.0~5.5 t/h, and the lump coal feed rate of the belt is 2.0~2.5 t/h;

in the reduction process, the back pressure of the spray gun is 30~40 kPa, the flue gas temperature is 500~550° C., the hearth negative pressure of the top-blowing furnace is −10~0 Pa, the oxygen-enriched concentration of the spray gun air is 33~36 wt. %, the tail gas CO concentration is 2000~5000 ppm, the pulverized coal feeding amount of the spray gun is 4.0~5.0 t/h, and the lump coal feeding amount of the belt is 4.0~5.0 t/h;

when the CO concentration in the tail gas is higher than 5000 ppm, the reduction process is terminated by continuously increasing the CO concentration to 20000 ppm.

Preferably, feeding the low-sulfur arsenic-containing tin ore and the coarse dry material contain tin into the top-blown furnace through the belt so that the depth of a molten pool in the furnace is not less than or equal to 500 mm, then starting the lance to feed the tin-containing fine dry material and the recovered tin-containing material into the top-blown furnace;

In the feeding cycle, conveying the low-sulfur arsenic-containing tin ore and the coarse dry material containing tin through a belt, and the molten pool depth is 1500-1800 mm.

The preferred technical scheme has the beneficial effects that: firstly, the coarse dry materials are input into the top-blown furnace through the belt, and then the spray gun is started to spray the fine dry materials into the top-blown furnace after the depth of the top-blown furnace reaches 500 mm, so that the fine dry materials can be prevented from flying in the top-blown furnace without falling into the top-blown furnace due to insufficient depth of the molten furnace, and the improvement of comprehensive recovery index of smelting can be avoided.

Preferably, the depth of the molten pool is measured by insertion of a furnace top rod into the molten pool.

The beneficial effect of the above optimum technical scheme is that the furnace top sample rod is inserted into the molten pool in real time to monitor the depth of the molten pool, and the optimal control of the smelting process parameters is ensured.

Preferably, In the step (3), a vulcanizing agent is added in the fuming furnace to volatilize the tin fume in the slag of the top blowing furnace according to the molar ratio of S/(Sn+Cu) of 1:3 and the excess coefficient of 1.2-1.3, within 90-120 minute, the addition of the vulcanizing agent is completed, and the tin content of the high-temperature melt in the fuming furnace is less than or equal to 0.3 wt. %; when the sample analysis shows that the tin content in the high-temperature melt in fuming furnace is more than 0.3 wt. %, the vulcanizing agent is added to volatilize tin until the tin content in the high-temperature melt is less than or equal to 0.3 wt. %.

According to the above technical scheme, compared with the prior art, the present disclosure provides a system and method for smelting tin-containing materials, which has the following beneficial effects:
(1) in the present disclosure, the tin-containing dry material are classified, the tin-containing material with fine granularity are transported through a fully-closed pneumatic pipeline, and then directly injected into the molten pool through an injection gun, in addition, mechanical inclusion or flying loss caused by that belt put into the top blowing furnace can be avoided;
(2) tin-containing materials with dry moisture and fine granularity are directly sprayed into the molten pool through the spray gun, which can save the process of adding water and granulating, and avoid introducing a large amount of moisture in the smelting process, thus avoiding excess moisture from occupying smelting production capacity and reducing smelting energy consumption; at the same time, the introduced water is prevented from changing into high-temperature steam and entering the flue gas treatment system of the subsequent process, thereby reducing the treatment capacity and treatment cost of the flue gas treatment system;
(3) tin-containing materials with larger particle size and tin-containing materials with smaller particle size are respectively transported into the furnace from the top belt of the top-blown furnace and the top-blown furnace spray gun, giving full play to the adaptability of the top-blown furnace to deal with complex materials and realizing green and environmentally-friendly smelting production;
(4) fine-grained tin-containing materials are transported by fully enclosed pneumatic pipeline, and sprayed into the molten pool by spray gun for reduction smelting, without adding water for granulation, which not only has less material transportation loss, smooth material transportation, good occupational hygiene on the job site, simple operation and high recovery rate of coarse tin smelting, but also reduces the energy consumption of adding water for granulation of dust materials with fine-grained tin, reduces the dust rate of top-blown furnace, and further improves the technical and economic indexes and production benefits of tin smelting;
(5) in order to prevent water from being brought into the smelting flue gas to water granulation, the moisture content of the flue gas is reduced by 10 wt. %, thereby reducing the granulation energy consumption and reducing the proportion of granulation energy consumption in the comprehensive energy consumption of smelting by 5%, in addition, the smoke and dust rate of the top blow furnace is reduced by 5%, and the technical and economic index of tin smelt is improved by 2-3 percentage points.

BRIEF DESCRIPTION OF THE DRAWINGS

In order to more clearly explain that embodiments of the present disclosure or the technical scheme in the prior art, the following brief description will be given of the drawings which are require for use in the description of the embodiments or the prior art, the drawings in the following description are merely embodiments of the present disclosure, and for those skilled in the art, other drawings may be obtained on the basis of the provided drawings without any creative effort.

FIG. 1 is is a schematic structural diagram of embodiment 1 provided by the present disclosure;

In the drawings: 1—top-blown furnace, 2—belt, 3—flue, 4—temperature measuring device, 5—furnace top sample rod, 6—spray gun, 7—metal hose, 8—second front bin, 9—first front bin, 10—pulverized coal bin, 11—mixing air pipeline, 12—fluosolid furnace, 13—cooler, 14—scraper of the fluosolid furnace, 15—screening machine, 16—fine material silo, 17—coarse material silo, 18—special skip truck, 19—first pneumatic pipeline, 20—coarse tin port, 21—tin-converting bun, 22—slag mouth, 23—slag chute, 24—fuming top-blown furnace waste heat boiler, 25—top-blown furnace electric dust collector, 26—top-blown furnace dust scraper, 27—top-blown furnace dust bin, 28—fuming furnace, 29—fuming furnace waste heat boiler, 30—fuming furnace surface cooler, 31—fuming furnace bag dust collector, 32—fuming dust scraper, 33—fuming dust bin, 34—slag discharge port of fuming furnace, 35—second pneumatic pipeline, 36—first blanking pipeline, 37—second blanking pipeline, 38—batching bin.

DETAILED DESCRIPTION OF THE EMBODIMENTS

In the following, the technical solutions in the embodiments of the present disclosure will be clearly and completely described with reference to the drawings in the embodiments of the present disclosure, obviously, the described embodiments are only part of the embodiments of the present disclosure, not all of them. Based on the embodiments in the present disclosure, all other embodiments obtained by ordinary technicians in the field without creative work are within the scope of the present disclosure.

Embodiment 1

The embodiment of the disclosure discloses a system for smelting tin-containing materials, including a pretreatment mechanism, a screening mechanism, a feeding mechanism, a smelting mechanism, a slag treatment mechanism and a tail gas treatment mechanism;
 the downstream of that pretreatment mechanism is connected with the screening mechanism;
 the screening mechanism includes a screening machine, a fine material bin and a coarse material bin; wherein the upstream of the screening machine is connected with the downstream of the pretreatment mechanism, the upper-screen material outlet of the screening machine is connected with the coarse material bin, the under-screen material outlet of the screening machine is connected with the fine material bin, and the coarse material bin and the fine material bin are respectively connected with the smelting mechanism through the feeding mechanism;
 The feeding mechanism includes a feeding device 40, a batching bin, a first front bin, a second front bin, a spray gun and a pulverized coal bin, wherein the feeding device includes a special hopper and a belt.
 the coarse material bin is communicated with the batching bin through the feeding device, and the batching bin is communicated with the smelting mechanism through the feeding device; the upstream of the first front bin is communicated with the fine material bin, and the downstream is communicated with the smelting mechanism through the spray gun; the upstream of the second front bin is respectively communicated with the slag treatment mechanism and the tail gas treatment mechanism, and the downstream is communicated with the smelting mechanism through the spray gun; wherein the pulverized coal bin communicated with the smelting mechanism through the spray gun.

The pretreatment mechanism includes a fluosolid furnace, a cooler and a fluosolid furnace scraper; the downstream of the fluosolid furnace is connected with the cooler; the downstream of the cooler is connected with the fluosolid furnace scraper; the downstream of the fluosolid furnace scraper is connected with the screening machine.

The feeding mechanism further includes a first pneumatic pipeline, a first blanking pipeline, a second pneumatic pipeline, a second blanking pipeline, a mixing pipeline and a metal hose; the first pneumatic pipeline is connected with the fine material bin and the first furnace front bin, and the first furnace front bin is connected with the mixing air pipeline through the first blanking pipeline; the upstream of the second pneumatic pipeline is connected with the slag treatment mechanism and the tail gas treatment mechanism respectively, and the downstream is connected with the second front bin, the second front bin is connected with the mixing air pipeline through the second blanking pipeline; the mixing air pipeline is at an angle of 75° with the first blanking pipeline and the second blanking pipeline respectively, and the mixing air pipeline is connected with the spray gun through the metal hose.

The smelting mechanism includes a top-blown furnace, a furnace top sample rod, a coarse tin mouth, a tin-converting bun and a slag mouth; the top of the top-blown furnace is communicated with the feeding device and connected with the tail gas treatment mechanism at the same time; wherein the spray gun penetrates through the top surface of the top-blown furnace and extends into the top-blown furnace, while the furnace top sample rod penetrates through the top surface of the top-blown furnace and extends into the top-blown furnace; and the bottom of the top-blown furnace is connected with the tin-turning steamed stuffed bun through the coarse tin port, and the bottom of the top-blown furnace is connected with the slag treatment mechanism through the slag port.

The slag treatment mechanism comprises a slag chute, a fuming furnace, a fuming furnace waste heat boiler, a fuming furnace surface cooler, a fuming furnace bag dust collector, a fuming dust scraper and a fuming dust bin; the fuming furnace is connected with the slag port through the slag chute, the bottom of the fuming furnace is provided with a slag discharge port of fuming furnace, and the top of the fuming furnace is connected with the fuming furnace waste heat boiler; the downstream of the fuming furnace waste heat boiler is connected with the fuming furnace surface cooler; the downstream of the fuming furnace is connected with the fuming furnace bag dust collector; the upstream of the fuming furnace dust scraper is respectively connected with the fuming furnace waste heat boiler and the fuming furnace bag dust collector, and the downstream is connected with the top-blown furnace dust bin; the downstream of the fuming furnace dust bin is connected with the second front bin through the second pneumatic pipeline.

The tail gas treatment mechanism includes a flue, a top-blown furnace waste heat boiler 24, a temperature measuring device, a top-blown furnace electric dust collector, a top-blown furnace dust scraper and a top-blown furnace dust bin; one end of the flue is connected with the top of the top-blown furnace, the other end is connected with the top-blown furnace waste heat boiler, and the temperature measuring device is installed at one end of the flue connected with the top of the top-blown furnace; the downstream of the top-blown furnace waste heat boiler is connected with the top-blown furnace electric dust collector; the upstream of the top-blown furnace dust scraper is respectively connected with the top-blown furnace waste heat boiler and the top-blown furnace electric dust collector, and the downstream is connected with the top-blown furnace dust bin; the downstream of that dust bin of the top-blown furnace is connected with the second front bin through the second pneumatic pipeline.

Embodiment 2

Embodiment 2 of the present disclosure discloses a method for smelting tin-containing materials, and the system disclosed in Embodiment 1 is utilized, specifically including the following steps:

(1) classifying all kinds of tin ores, transporting the obtained low-sulfur arsenic-containing tin ore to a batching bin by a special skip truck, conveying the obtained high-sulfur and arsenic-containing tin ore to a fluosolid furnace for pretreatment to obtain dry tin-containing materials; conveying the tin-containing dry material to a screening machine for screening, spraying the obtained tin-containing fine dry material into the top-blown furnace through a spray gun, transporting the obtained tin-containing coarse dry material to a batching bin by a special skip truck;

wherein, in the low-sulfur arsenic-containing tin ore, Sn is more than 30 wt. %, Pb is 0.2~3.0 wt. %, S is less than 1.0 wt. %, As is less than 1.0 wt. %, Fe is 10~30 wt. %, and Bi is 0.1~0.2 wt. %; in the high-sulfur arsenic-containing tin ore, Sn is more than 30 wt. %, Pb is 0.2~3.0 wt. %, S is more than 2.0 wt. %, As is more than 2.0 wt. %, Fe is 10~30 wt. %, and Bi is 0.1~0.5 wt. %;

the pretreatment is roasting at 650 to 720° C. for 2~2.5 h, the moisture content of the dry tin-containing material is less than 1%, Sn is more than 40 wt. %, Pb is 0.5~3.0 wt. %, S is less than 1.0 wt. %, As is less than 1.0 wt. %, Fe is 12~28 wt. %, and Bi is 0.5~3.0 wt. %;

in the screening, a 5-mesh screen is adopted, the granularity of the tin-containing fine dry material is 5~300 mesh, the granularity of the tin-containing coarse dry material is less than 5 mesh, and the bulk density is 2~3 g/cm$^3$.

(2) in a feeding cycle, feeding the low-sulfur arsenic-containing tin ore and the coarse tin-containing dry material with a flux of quartz sand and limestone into the top of a top-blown furnace through a belt after proportioning in a batching bin, according to the proportion, controlling the amount of the tin-containing fine dry material sprayed into the top-blown furnace by the spray gun and the amount of the recovered tin-containing material, and mixed melt is obtained after smelting in the top-blown furnace; then, stopping feeding and entering a reduction stage to obtain crude tin products and a top-blown furnace slag; according to the flue gas temperature measured by temperature measuring device and the change of CO concentration in tail gas measured by CO tail gas online monitor, adjusting the amount of lump coal fed by belt and pulverized coal fed by spray gun;

wherein, in the recover tin-containing material, Sn is 30~50 wt. %, Pb is 0.2~3.0 wt. %, S is less than 1.0 wt. %, As is less than 2.0 wt. %, Fe is 2~6 wt. %, Bi is 0.1~0.3 wt. %, moisture less than 5.0%, Particle size is 100~300 mesh, bulk density is 0.5~1.0 g/cm$^3$;

wherein, calculating the low-sulfur arsenic-containing tin ore, the tin-containing fine dry material, the tin-containing coarse dry material and the recovered tin-containing material comprehensively in the proportioning silo according to the proportioning principle, accurately controlling the addition amount of the low-sulfur arsenic-containing tin ore and the tin-containing coarse dry material input through the belt through the DCS feeding system of the batching bin, and simultaneously controlling the addition amount of the tin-containing fine dry material and the recovered tin-containing material input into the top blowing furnace through the spray gun;

the composition principle is: Sn content 38~48 wt. %, Pb content 1.0~5.0 wt. %, S content is more than 1.0 wt. %, Bi content 0.1~0.2 wt. %, As/Fe ratio 0.07~0.12, the silica sand and the limestone flux are added according to the silicic acid K is 1.2 to 1.4 and the melting point is 1150~1320° C.;

the low-sulfur arsenic-containing tin ore, the tin-containing fine dry material, the tin-containing coarse dry material and the recovered tin-containing material are calculated in 100 wt. %, 30~40 wt. %, 0~45 wt. %, 5~10 wt. %, 0~20 wt. %;

feeding the low-sulfur arsenic-containing tin ore and the coarse dry material contain tin into the top-blown furnace through the belt so that the depth of a molten pool in the furnace is not less than or equal to 500 mm, then starting the lance to feed the tin-containing fine dry material and the recovered tin-containing material into the top-blown furnace; in the feeding cycle, conveying the low-sulfur arsenic-containing tin ore and the coarse dry material containing tin through a belt, and the molten pool depth is 1500-1800 mm; and the depth of the molten pool is measure by inserting the furnace top sample rod into the molten pool.

In the smelting process: the back pressure of the spray gun is 20~30 kPa, the flue gas temperature is 400~500° C., the negative pressure of the hearth of the top-blown furnace is −10~0 Pa, the oxygen-enriched concentration of the spray gun air is 37~39 wt. %, the tail gas CO concentration is 0~500 ppm, the pulverized coal feed rate of the spray gun is 5.0~5.5 t/h, and the lump coal feed rate of the belt is 2.0~2.5 t/h;

in the reduction process, the back pressure of the spray gun is 30~40 kPa, the flue gas temperature is 500~550° C., the hearth negative pressure of the top-blowing furnace is −10~0 Pa, the oxygen-enriched concentration of the spray gun air is 33~36 wt. %, the tail gas CO concentration is 2000~5000 ppm, the pulverized coal feeding amount of the spray gun is 4.0~5.0 t/h, and the lump coal feeding amount of the belt is 4.0~5.0 t/h;

when the CO concentration in the tail gas is higher than 5000 ppm, the reduction process is terminated by continuously increasing the CO concentration to 20000 ppm.

(3) stopping feeding lump coal by belt and pulverized coal by spray gun after reduction, lifting the spray gun above the liquid level of the mixed melt; then opening the coarse tin port to input the coarse tin product into the tin-transfer pad; after reaching the slag discharge, blocking the coarse tin port, and opening the slag port to discharge the slag of the top-blown furnace to a fuming furnace for fuming treatment to obtain fuming dust; treating the tail gas produced by smelting in the top-blown furnace with tail gas to obtain recovered tail gas; conveying the recover tail gas and the fumed dust are respectively to a second front bin through a second pneumatic pipeline to form the recovered tin-containing material;

wherein, in the fuming process, a vulcanizing agent is added in the fuming furnace to volatilize the tin fume in the slag of the top blowing furnace according to the molar ratio of S/(Sn+Cu) of 1:3 and the excess coefficient of 1.2-1.3, within 90-120 minute, the addition of the vulcanizing agent is completed, and the tin content of the high-temperature melt in the fuming furnace is less than or equal to 0.3 wt. %; when the sample analysis shows that the tin content in the high-temperature melt in fuming furnace is more than 0.3 wt. %, the vulcanizing agent is added to volatilize tin until the tin content in the high-temperature melt is less than or equal to 0.3 wt. %.

(4) after the top-blown furnace slag is discharged, steps (2) to (3) can be repeated.

Embodiment 3

The embodiment 3 of the present disclosure discloses a method for smelting tin-containing materials, and the system disclosed in Embodiment 1 is utilized, specifically including the following steps:

(1) Firstly, the tin-containing materials should be classified: the low-sulfur arsenic-containing tin ore with Sn>30 wt. %, Pb in 0.2~3.0 wt. %, S<1.0 wt. %, As<1.0 wt. %, Fe in 10~30 wt. % and Bi in 0.1~0.2 wt. % is transported to the batching bin by a special material truck; 30 wt. % Sn, 0.2 wt. % Pb, 2.0 wt. % S, 2.0 wt. % As, 10 wt. % Fe and 0.1 wt. % Bi are added into a fluosolid furnace to be roasted at 650~720° C. for 2~2.5 hours, desulfurization and dearsenization are performed, and the dry tin-containing materials produced contain 45 wt. % Sn, 1.5 wt. % Pb, 0.7 wt. % S, 0.5 wt. % As, 18 wt. % Fe, 0.08 wt. % Bi and the moisture is less than 1%; screening dry tin-containing materials by using a screening machine, wherein the materials sieved by 5-mesh are fine dry tin-containing materials, and the materials sieved by sieves are coarse dry tin-containing materials.

Wherein, the grain size of dry tin-containing fine particles is 15 mesh, the grain size of dry tin-containing coarse particles is 4 mesh, and the stacking density is 2 g/cm$^3$, the dry tin-containing fine particles are transported to the first furnace front bin for storage through the first pneumatic pipeline, and the dry tin-containing coarse particles are transported to the batching bin by the special material truck, and then transported to the top-blown furnace by the belt after comprehensive batching in the ore bin.

Calculating the low-sulfur arsenic-containing tin ore, the tin-containing fine dry material, the tin-containing coarse dry material and the recovered tin-containing material comprehensively in the proportioning silo according to the proportioning principle, accurately controlling the addition amount of the low-sulfur arsenic-containing tin ore and the tin-containing coarse dry material input through the belt through the DCS feeding system of the batching bin, and simultaneously controlling the addition amount of the tin-containing fine dry material and the recovered tin-containing material input into the top blowing furnace through the spray gun; the proportioning ratios of low-sulfur and arsenic-containing tin ore, tin-containing fine dry materials, tin-containing coarse dry materials and recovered tin-containing materials are 35 wt. %, 45 wt. %, 10 wt. % and 10 wt. %, respectively, according to comprehensive calculation, the mixed materials in the furnace are Sn 48 wt. %, Pb 5.0 wt. %, S 0.9 wt. %, As/Fe ratio of 0.07 and Bi 0.1 wt. %, and quartz sand and limestone flux are added according to the silicate degree k=1.4, and the melting point is 1150° C.

Wherein, the low-sulfur and arsenic-containing tin ore is composed of Sn 35 wt. %, Pb 0.2 wt. %, S 1.0 wt. %, As<1.0 wt. %, Fe 10 wt. % and Bi 0.1 wt. %.

The recovered tin-containing materials are composed of fuming dust and recovered tail gas, which are directly transported to the second bin in front of the furnace through the second pneumatic pipeline for storage. The particle size of fuming dust is 100 mesh, the bulk density is 0.5 g/cm$^3$, the composition is Sn 45 wt. %, Pb 0.2 wt. %, S 0.9 wt. %, As 1.5 wt. %, Fe 2 wt. %, Bi 0.1 wt. %. The particle size of the recovered tail gas is 150 mesh, the bulk density is 0.6 g/cm$^3$, and the moisture is less than 5 wt. %, the composition is Sn 38 wt. %, Pb 1 wt. %, S 0.75 wt. %, As 1.8 wt. %, Fe 3 wt. %, Bi 0.1 wt. %.

Fine tin-containing dry materials and recovered tin-containing materials are connected by the discharge pipeline of the front bin and the mixing air pipe in front of the common furnace, and the air pressure of the mixing air pipe shall be 5-10% lower than that of the discharge pipeline of each front bin. The feeding pipe of each bin in front of the furnace is connected with the mixing air pipeline at a tangent angle of 70~75 degrees.

The time control of tin-containing fine dry materials and recycled tin-containing materials entering the molten pool for smelting through the top-blown furnace spray gun shall be started after the depth of the molten pool in the top-blown furnace reaches 500 mm, and the feeding shall be stopped after the completion of a complete feeding cycle, and the dosing amount of low-sulfur arsenic-containing tin ore and tin-containing coarse dry materials conveyed by the roof belt shall be adjusted; the depth of the molten pool is detected by inserting the furnace top sample rod of the top-blown furnace into the molten pool.

The feeding cycle is that the feeding belt at the top of the top-blown furnace starts to feed until the height of the molten pool reaches 1500 mm, and the smelting process is completed within the feeding cycle time, and then it enters the reduction stage of smelting high-temperature mixed melt.

The melting process control of tin-containing materials is as follows: the back pressure of the lance is controlled at 20~30 kPa, the temperature measuring temperature of the flue gas of the top-blowing furnace is controlled at 500° C., the furnace negative pressure is −10~0 Pa, the oxygen-enriched concentration of the lance air is 37~39 wt. %, the tail gas CO concentration is 0~500 ppm, the pulverized coal is 5.0~5.5 t/h from the lance, and the lump coal is 2.0~2 from the top-blown furnace belt.

The reduction process control of the high-temperature mixed melt is as follows: the back pressure of the lance is controlled at 30~40 kPa, the temperature measuring temperature of the top-blowing furnace flue gas is controlled at 500~550° C., the furnace negative pressure is −10~0 Pa, the oxygen-enriched concentration of the lance air is 33~36 wt. %, the tail gas CO concentration is 2000~5000 ppm, the pulverized coal is fed by the lance at 4.0~5.0 t/h, and the top-blown furnace belt is fed to the block.

(3) When the CO concentration of the tail gas is continuously increased from more than 5000 ppm to 20000 ppm, the reduction is finished, the feeding of lump coal by belt and fine coal by spray gun is stopped, and the spray gun is lifted to above the liquid surface of the mixed melt;

Wherein, in the fuming process, a vulcanizing agent is added into the fuming furnace to fume and volatilize the tin in the top-blown furnace slag, the vulcanizing agent is added according to the molar ratio of S/(Sn+Cu) of 1:3 and the excess coefficient of 1.2-1.3, within 90-120 minute, the addition of the vulcanizing agent is completed, and the tin content of the high-temperature melt in the fuming furnace is less than or equal to 0.3 wt. %; when the sample analysis shows that the tin content in the high-temperature melt in fuming furnace is more than 0.3 wt. %, the vulcanizing agent is added to volatilize tin until the tin content in the high-temperature melt is less than or equal to 0.3 wt. %.

(4) Step (2) to (3) can be repeated after the top-blown furnace slag is discharged.

Embodiment 4

The embodiment 4 of the present disclosure discloses a method for smelting tin-containing materials, and the system disclosed in Embodiment 1 is utilized, specifically including the following steps:

(1) Firstly, the tin-containing materials should be classified: the low-sulfur arsenic-containing tin ore with Sn>30 wt. %, Pb in 0.2~3.0 wt. %, S<1.0 wt. %, As<1.0 wt. %, Fe in 10~30 wt. % and Bi in 0.1~0.2 wt. % is transported to the batching bin by a special material truck; the high-sulfur and arsenic-containing tin ore containing Sn 35 wt. %, Pb 2.0 wt. %, S 3.0 wt. %, As 2.5 wt. %, Fe 15 wt. % and Bi 0.2 wt. % is fluidized to be roasted at 650~720° C. for 2~2.5 hours, and desulfurization and dearsenization are performed, so that the dry tin-containing materials produced contain Sn 45 wt. %, Pb 1.5 wt. %, S 0.7 wt. %, As 0.5 wt. %, Fe 18 wt. %, Bi 0.08 wt. % and moisture less than 1%; screening dry tin-containing materials by using a screening machine, wherein the materials sieved by 5-mesh are fine dry tin-containing materials, and the materials sieved by sieves are coarse dry tin-containing materials.

Wherein, the granularity of dry tin-containing fine particles is 300 mesh, the granularity of dry tin-containing coarse particles is 4 mesh, and the stacking density is 2.5 g/cm$^3$, the dry tin-containing fine particles are transported to the first furnace front bin for storage through the first pneumatic pipeline, and the dry tin-containing coarse particles are transported to the batching bin by the special material truck, and then transported to the top-blown furnace by the belt after comprehensive batching in the ore bin.

Calculating the low-sulfur arsenic-containing tin ore, the tin-containing fine dry material, the tin-containing coarse dry material and the recovered tin-containing material comprehensively in the proportioning silo according to the proportioning principle, accurately controlling the addition amount of the low-sulfur arsenic-containing tin ore and the tin-containing coarse dry material input through the belt through the DCS feeding system of the batching bin, and simultaneously controlling the addition amount of the tin-containing fine dry material and the recovered tin-containing material input into the top blowing furnace through the spray gun; the proportioning ratios of low-sulfur and arsenic-containing tin ore, tin-containing fine dry materials, tin-containing coarse dry materials and recovered tin-containing materials are 35 wt. %, 45 wt. %, 10 wt. % and 10 wt. %, respectively, according to comprehensive calculation, the mixed materials in the furnace are Sn 48 wt. %, Pb 5.0 wt. %, S 0.9 wt. %, As/Fe ratio of 0.12 and Bi 0.2 wt., and quartz sand and limestone flux are added according to the silicate degree k=1.2, and the melting point is 1320° C.

Wherein, the low-sulfur and arsenic-containing tin ore is composed of Sn 50 wt. %, Pb 3.0 wt. %, S<1.0 wt. %, As 0.3 wt. %, Fe 30 wt. % and Bi 0.2 wt. %.

The recovered tin-containing materials are composed of fuming dust and recovered tail gas, which are directly transported to the second bin in front of the furnace through the second pneumatic pipeline for storage. The particle size of fuming dust is 200 mesh, the bulk density is 0.8 g/cm$^3$, the composition is Sn 45 wt. %, Pb 0.3 wt. %, S 0.50 wt. %, As 1.2 wt. %, Fe 3 wt. %, Bi 0.12 wt. %. The particle size of the recovered tail gas is 300 mesh, the bulk density is 1.0 g/cm$^3$, the composition is Sn 42 wt. %, Pb 1.5 wt. %, S 0.5 wt. %, As 1.8 wt. %, Fe 6 wt. %, Bi 0.3 wt. %, and the moisture is less than 5 wt. %.

Fine tin-containing dry materials and recovered tin-containing materials are connected by the discharge pipeline of the front bin and the mixing air pipe in front of the common furnace, and the air pressure of the mixing air pipe shall be 5-10% lower than that of the discharge pipeline of each front bin. The feeding pipe of each bin in front of the furnace is connected with the mixing air pipeline at a tangent angle of 70~75 degrees.

The time control of tin-containing fine dry materials and recycled tin-containing materials entering the molten pool for smelting through the top-blown furnace spray gun shall be started after the depth of the molten pool in the top-blown furnace reaches 500 mm, and the feeding shall be stopped after the completion of a complete feeding cycle, and the dosing amount of low-sulfur arsenic-containing tin ore and tin-containing coarse dry materials conveyed by the roof belt shall be adjusted; the depth of the molten pool is detected by inserting the furnace top sample rod of the top-blown furnace into the molten pool.

The feeding cycle is that the feeding belt at the top of the top-blown furnace starts to feed until the height of the molten pool reaches 1500 mm, and the smelting process is completed within the feeding cycle time, and then it enters the reduction stage of smelting high-temperature mixed melt.

The melting process control of tin-containing materials is as follows: the back pressure of the lance is controlled at 20~30 kPa, the temperature measuring temperature of the flue gas of the top-blowing furnace is controlled at 500° C., the furnace negative pressure is −10~0 Pa, the oxygen-enriched concentration of the lance air is 37~39 wt. %, the tail gas CO concentration is 0~500 ppm, the pulverized coal is 5.0~5.5 t/h from the lance, and the lump coal is 2.0~2.5 from the top-blown furnace belt.

The reduction process control of the high-temperature mixed melt is as follows: the back pressure of the lance is controlled at 30~40 kPa, the temperature measuring temperature of the top-blowing furnace flue gas is controlled at 500~550° C., the furnace negative pressure is −10~0 Pa, the oxygen-enriched concentration of the lance air is 33~36 wt. %, the tail gas CO concentration is 2000~5000 ppm, the pulverized coal is fed by the lance at 4.0~5.0 t/h, and the top-blown furnace belt is fed to the block.

(3) When the CO concentration of the tail gas is continuously increased from more than 5000 ppm to 20000 ppm, the reduction is finished, the feeding of lump coal by belt and fine coal by spray gun is stopped, and the spray gun is lifted to above the liquid surface of the mixed melt;

Wherein, in the fuming process, a vulcanizing agent is added into the fuming furnace to fume and volatilize the tin in the top-blown furnace slag, the vulcanizing agent is added according to the molar ratio of S/(Sn+Cu) of 1:3 and the excess coefficient of 1.2-1.3, within 90-120 minutes, the addition of the vulcanizing agent is completed, and the tin content of the high-temperature melt in the fuming furnace is less than or equal to 0.3 wt. %; when the sample analysis shows that the tin content in the high-temperature melt in fuming furnace is more than 0.3 wt. %, the vulcanizing agent is added to volatilize tin until the tin content in the high-temperature melt is less than or equal to 0.3 wt. %.

(4) Step (2) to (3) can be repeated after the top-blown furnace slag is discharged.

In this specification, each embodiment is described in a progressive manner, and each embodiment focuses on the differences between the embodiments and the other embodiments, and the same similar parts among the embodiments may be referred to each other. For the device disclosed in the embodiment, since it corresponds to the method disclosed in the embodiment, the description is relatively simple, and for the relevant points, refer to the description of the method part.

The above description of the disclosed embodiments enables those skilled in the art to realize or use the present disclosure. Many modifications to these embodiments will be obvious to those skilled in the art, and the general principles defined herein can be implemented in other embodiments without departing from the spirit or scope of the present disclosure. Therefore, the present disclosure will not be limited to the embodiments shown herein, but should be accorded the widest scope consistent with the principles and novel features disclosed herein.

What is claimed is:

1. A system for smelting tin-containing materials, comprising a pretreatment mechanism, a screening mechanism, a feeding mechanism, a smelting mechanism, a slag treatment mechanism and a tail gas treatment mechanism;
   the screening mechanism comprises a screening machine, a fine material silo and a coarse material silo;
   an upstream of the screening machine is connected with a downstream of the pretreatment mechanism, an upper-screen material outlet of the screening machine is connected with the coarse material silo, an under-screen material outlet of the screening machine is connected with the fine material silo, and the coarse material silo and the fine material silo are respectively connected with the smelting mechanism through the feeding mechanism;
   the feed mechanism comprises a feeding device, a batching bin, a first front bin, a second front bin, a spray gun and a pulverized coal bin;
   the coarse material silo is communicated with the batching bin through the feeding device, and the batching bin is communicated with the smelting mechanism through the feeding device;
   an upstream of the first front bin is communicated with the fine material silo, and a downstream of the first front bin is communicated with the smelting mechanism through the spray gun;
   an upstream of the second front bin is communicated with the slag treatment mechanism, and the tail gas treatment mechanism is downstream of the second front bin and is communicated with the smelting mechanism through the spray gun;
   wherein the pulverized coal bin communicated with the smelting mechanism through the spray gun.

2. The system of claim 1, wherein the pretreatment mechanism comprises a fluosolid furnace, a cooler and a fluosolid furnace scraper;
   a downstream of the fluosolid furnace is connected with the cooler;

a downstream of the cooler is connected with the fluosolid furnace scraper;

a downstream of the fluosolid furnace scraper is connected with the screening machine.

3. The system of claim 2, wherein the feeding mechanism further comprises a first pneumatic pipeline, a first blanking pipeline, a second pneumatic pipeline, a second blanking pipeline, a mixing pipeline and a metal hose;

the first pneumatic pipeline is connected with the fine material silo and the first front bin, and the first front bin is connected with a mixing air pipeline through the first blanking pipeline;

an upstream of the second pneumatic pipeline is connected with the slag treatment mechanism and the tail gas treatment mechanism respectively, and a downstream of the second pneumatic pipeline is connected with the second front bin, the second front bin is connected with the mixing air pipeline through the second blanking pipeline;

the mixing air pipeline is 70~75 degrees with the first blanking pipeline and the second blanking pipeline respectively, and the mixing air pipeline is connected with the spray gun through the metal hose.

4. The system of claim 3, wherein the smelting mechanism comprises a top-blown furnace, a furnace top sample rod, a coarse tin port, a tin-converting bun and a slag mouth;

a top of the top-blown furnace is communicated with the feeding device and connected with the tail gas treatment mechanism at the same time;

wherein the spray gun penetrates through a top surface of the top-blown furnace and extends into the top-blown furnace, while the furnace top sample rod penetrates through the top surface of the top-blown furnace and extends into the top-blown furnace;

and a bottom of the top-blown furnace is connected with a tin-turning steamed stuffed bun through a coarse tin port, and the bottom of the top-blown furnace is connected with the slag treatment mechanism through a slag port.

5. The system of claim 4, wherein the slag treatment mechanism comprises a slag chute, a fuming furnace, a fuming furnace waste heat boiler, a fuming furnace surface cooler, a fuming furnace bag dust collector, a fuming dust scraper and a fuming dust bin;

the fuming furnace is connected with the slag port through the slag chute, the bottom of the fuming furnace is provided with a slag discharge port of fuming furnace, and a top of the fuming furnace is connected with the fuming furnace waste heat boiler;

a downstream of the fuming furnace waste heat boiler is connected with the fuming furnace surface cooler; a downstream of the fuming furnace is connected with the fuming furnace bag dust collector;

an upstream of the fuming furnace dust scraper is respectively connected with the fuming furnace waste heat boiler and the fuming furnace bag dust collector, and a downstream of the fuming furnace dust scraper is connected with a top-blown furnace dust bin;

a downstream of the fuming furnace dust bin is connected with the second front bin through the second pneumatic pipeline.

6. The system of claim 5, wherein the tail gas treatment mechanism comprises a flue, a top-blown furnace waste heat boiler, a temperature measuring device, a top-blown furnace electric dust collector, a top-blown furnace dust scraper and the top-blown furnace dust bin;

one end of the flue is connected with the top of the top-blown furnace, the other end is connected with the top-blown furnace waste heat boiler, and the temperature measuring device is installed at one end of the flue connected with the top of the top-blown furnace;

a downstream of the top-blown furnace waste heat boiler is connected with the top-blown furnace electric dust collector;

an upstream of the top-blown furnace dust scraper is respectively connected with the top-blown furnace waste heat boiler and the top-blown furnace electric dust collector, and a downstream of the top-blown furnace dust scraper is connected with the top-blown furnace dust bin;

a downstream of that dust bin of the top-blown furnace is connected with the second front bin through the second pneumatic pipeline.

\* \* \* \* \*